Patented May 26, 1936

2,042,413

UNITED STATES PATENT OFFICE 2,042,413

SOLVING, SOFTENING, AND GELATINIZING AGENTS

Walther Schrauth, Berlin-Dahlem, Germany, assignor, by mesne assignments, to "Unichem" Chemikalien Handels A.-G., Zurich, Switzerland, a corporation of Switzerland No Drawing. Application August 20, 1932, Serial No. 629,756. In Germany August 20, 1931

7 Claims. (Cl. 106—40)

It has been found that especially excellent solvents, softening and gelatinizing agents for cellulose-esters are obtained if the high-molecular alcohols of the fatty series or the naphthenic series are etherified with themselves or better with other lower molecular alcohols according to known methods. The etherification can be carried out in such a manner that for instance the alcohols are converted into the corresponding halogen-compounds and are reacted with the alkali-compounds of the other necessary alcohol-component whereby the conversion can be executed suitably in presence of a neutral diluent. The etherification can otherwise be carried out by heating up the component alcohols in the presence of dehydrating agents such as zinc-chloride, concentrated sulfuric acid and the like.

Also the etherification can be executed according to another of the known etherification methods. As high molecular alcohols of the fatty series, which are adapted for etherification, can be used either monohydric saturated alcohols, as dodecyl or cetyl alcohol, or monohydric unsaturated alcohols, as oleyl alcohol or polyhydric saturated alcohols, as hydroxy-octadecanol, and polyhydric unsaturated alcohols, as dihydroxy-octadecenol or ricinus-alcohol, obtained by reduction of castor-oil according to the known method of Bouveault and Blanc. Of the polyhydric alcohols either one or all hydroxyl groups can be etherified. The naphthenic alcohols which may be used are obtained by reducing technical commercial naphthenic acids, especially those produced from Russian petroleum. The second alcohol component necessary for etherification can be the same alcohols already mentioned or can be low molecular aliphatic monohydric alcohols, such as ethyl-alcohol, butyl-alcohol and others or can be polyhydric alcohols as glycol or glycerol. The ethers as obtained are suitable to use as solvents, softening and gelatinizing agents as additions for producing plastic masses, for obtaining celluloid, for manufacturing lacquers and films.

In the following the invention will be illustrated by a few examples without being confined to the ethers mentioned in these examples.

Example I

For preparing a putty-mass a nitrocellulose solution, which contains 90 parts collodion cotton, 10 parts camphor and 50 parts glycolmono-cetyl ether dissolved in 40 parts acetone, 10 parts butylacetate, 40 parts butanol and 220 parts toluene, is added to 1 to 3 times the quantity of a well ground paste consisting of 10 parts lithopone, 8 parts slate-meal and 3 parts of oleylacetate and xylol, and is well mixed.

Example II

If 100 parts nitrocellulose and 50 parts of a naphthenyl-ethyl ether, which is obtained by treating a naphthenic alcohol (boiling-point 12 mm. 100–180°, acetyl number 170–180°) with ethyl sulfate in the presence of sulfuric acid, are dissolved in a mixture of 500 parts butyl-acetate, 75 parts butanol and 300 parts toluene, a lacquer is obtained which produces a flexible film after drying.

Example III

A good spraying-lacquer or dipping varnish, which yields a flexible colorless film, is obtained by dissolving 100 parts nitrocellulose, 10 parts phthalic-acid-dibutyl ester and 25 parts dilauryl ether in a mixture of 550 parts butyl acetate, 75 parts butanol and 250 parts toluene.

Example IV

For producing a lacquer for motor-cars 60 parts manila-copal, 40 parts collodion cotton and 35 parts oleylethyl ether are dissolved in 300 parts acetone, 380 parts alcohol, 245 parts benzene and 150 parts amyl-acetate and are mixed with the desired dyestuffs and fillers.

Instead of oleyl-ethyl ether also the monoethyl ether of the ricinus alcohol as obtained by reduction according to the method of Bouveault and Blanc or the dimethyl-ether of the dihydroxy-octadecenol can be applied in the same manner.

Example V

A mass suitable for kneading which is well adapted for producing formed celluloid-compounds is obtained by mixing 75 parts nitrocellulose, 15 parts cetyl butyl ether, 6 parts camphor and 30 parts alcohol. To this mass 10 to 20% pigment can be added.

What I claim is:—

1. A plastic material comprising a cellulose ester and as a softening and plasticizing agent an ether of two alcohols, one being an alcohol of the group consisting of dodecyl, cetyl, oleyl, dihydroxy-octadecane, dihydroxy-octadecene and naphthenic alcohol, and the other being an alcohol of the group consisting of ethyl, butyl, glycol, glycerol, dodecyl, cetyl, oleyl, dihydroxy-octadecane, dihydroxy-octadecene and naphthenic alcohol.

2. A plastic material comprising a cellulose ester and as a softening and plasticizing agent an ether of two alcohols, one being an alcohol of the group consisting of dodecyl, cetyl, oleyl, dihydroxy-octadecane, dihydroxy-octadecene and naphthenic alcohol and the other being ethyl alcohol.

3. A plastic material comprising a cellulose ester and as a softening and plasticizing agent an ether of two alcohols, one being an alcohol of the group consisting of dodecyl, cetyl, oleyl, dihydroxy-octadecane, dihydroxy-octadecene and naphthenic alcohol, and the other alcohol being glycol.

4. A plastic material comprising a cellulose ester and as a softening and plasticizing agent an ether of two alcohols, one being an alcohol of the group consisting of ethyl, butyl, glycol, glycerol, dodecyl, cetyl, oleyl, dihydroxy-octadecane, dihydroxy-octadecene and naphthenic alcohol and the other alcohol being dihydroxy-octadecene.

5. A plastic material comprising a cellulose ester and as a softening and plasticizing agent oleyl ethyl ether.

6. A plastic material comprising a cellulose ester and as a softening and plasticizing agent mono cetyl glycol.

7. A plastic material comprising a cellulose ester and as a softening and plasticizing agent an ether of two alcohols one being ethyl alcohol and the other being dihydroxy-octadecene.

WALTHER SCHRAUTH.